(12) United States Patent
Zhang et al.

(10) Patent No.: US 11,161,763 B2
(45) Date of Patent: Nov. 2, 2021

(54) MULTI-STAGE GRAVITY-TYPE SLUDGE DRYING APPARATUS AND METHOD FOR DRYING SLUDGE USING SAME

(71) Applicant: NANCHANG HANGKONG UNIVERSITY, Jiangxi (CN)

(72) Inventors: Xukun Zhang, Jiangxi (CN); Meng Chen, Jiangxi (CN); Xiaowang Wu, Jiangxi (CN); Zhu an Yang, Jiangxi (CN); Maoyun Gan, Jiangxi (CN); Xueping Zou, Jiangxi (CN); Pu Xing, Jiangxi (CN); Baoli Zhu, Jiangxi (CN)

(73) Assignee: NANCHANG HANGKONG UNIVERSITY, Nanchang (CN)

( * ) Notice: Subject to any disclaimer, the term of this patent is extended or adjusted under 35 U.S.C. 154(b) by 96 days.

(21) Appl. No.: 16/734,366

(22) Filed: Jan. 5, 2020

(65) Prior Publication Data

US 2020/0377400 A1    Dec. 3, 2020

(30) Foreign Application Priority Data

May 28, 2019    (CN) .......................... 201910449886.0

(51) Int. Cl.
*F26B 3/32* (2006.01)
*C02F 11/13* (2019.01)
(Continued)

(52) U.S. Cl.
CPC ............ *C02F 11/13* (2019.01); *C02F 11/121* (2013.01); *F26B 23/004* (2013.01); *C02F 2303/10* (2013.01); *F26B 2200/18* (2013.01)

(58) Field of Classification Search
CPC .. F26B 3/18; F26B 3/20; F26B 23/004; F26B 2200/02; F26B 2200/04; F26B 2200/18;
(Continued)

(56) References Cited

U.S. PATENT DOCUMENTS 2,006,703 A * 7/1935 Van Marle ............ F26B 17/286
159/11.1
2,277,361 A * 3/1942 Bonotto .................... A23L 5/21
34/498
(Continued)

FOREIGN PATENT DOCUMENTS

CN         1686876 A        10/2005
CN       200989712 Y        12/2007
(Continued)

OTHER PUBLICATIONS

Zhang Xukun et al., Drying models and characteristics of thin layer sludge in superheated steam drying [J], Transactions of the Chinese Society of Agricultural Engineering, 2014, 30 (14): 258-266.

*Primary Examiner* — John P McCormack (57) ABSTRACT

Disclosed are a multi-stage gravity-type sludge drying apparatus and a sludge drying method using the same. The drying apparatus includes: a dryer, a preheater, a steam generator, a filter, a steam or water separation buffer tank, a steam compressor, a cooling water pump, a sealed discharge device, pipes and valves. The dryer includes several indirect dryer modules. The transportation of sludge in the dryer is achieved by gravity. The inner cavity of respective indirect dryers is filled with high-temperature steam to dry the sludge by indirect heating. The condensate water in the cavity is recycled and fed into the preheater to perform preheating and impurity removal on the wet sludge. The secondary steam generated in the dryer is filtered, compressed and overheated to become a new heat source for indirect heating in the cavity and convection drying at a bottom of the dryer.

8 Claims, 5 Drawing Sheets

(51) Int. Cl.
    *C02F 11/121*     (2019.01)
    *F26B 23/00*     (2006.01)

(58) Field of Classification Search
    CPC ...... F26B 3/26; F26B 3/24; F26B 3/32; F26B 13/14; F26B 13/145; F26B 13/16; F26B 13/18; F26B 15/20; F26B 17/101; F26B 17/12; C02F 11/13; C02F 11/121; C02F 2303/10; Y02W 10/30; Y02W 10/37
    USPC ............... 34/399, 519, 521, 72, 78, 108
    See application file for complete search history.

(56) References Cited

U.S. PATENT DOCUMENTS

| | | | | |
|---|---|---|---|---|
| 5,879,566 | A * | 3/1999 | Snyder | C03B 5/005 |
| | | | | 210/771 |
| 2010/0160709 | A1 * | 6/2010 | Grierson | B07B 13/113 |
| | | | | 588/312 |

FOREIGN PATENT DOCUMENTS

| | | |
|---|---|---|
| CN | 102260033 A | 11/2011 |
| CN | 203741205 U | 7/2014 |
| CN | 204079744 U | 1/2015 |
| CN | 205222968 U | 5/2016 |
| CN | 106219936 A | 12/2016 |
| CN | 205808034 U | 12/2016 |
| CN | 206359409 U | 7/2017 |
| CN | 107148814 A | 9/2017 |
| CN | 206828352 U | 1/2018 |
| CN | 207159076 U | 3/2018 |

* cited by examiner

MULTI-STAGE GRAVITY-TYPE SLUDGE DRYING APPARATUS AND METHOD FOR DRYING SLUDGE USING SAME

CROSS-REFERENCE TO RELATED APPLICATIONS

This application claims the benefit of priority from Chinese Patent Application No. 201910449886.0, filed on May 28, 2019. The content of the aforementioned application, including any intervening amendments thereto, is incorporated herein by reference in its entirety.

TECHNICAL FIELD

The present application relates to sludge drying, and more particularly to a multi-stage gravity-type sludge drying apparatus and a method for drying sludge using the same.

BACKGROUND OF THE INVENTION

Reducing the moisture content in sludge is an effective way for sludge reduction, and the sludge can be rapidly dried through thermal evaporation. Several aspects should be taken into consideration during the sludge drying process, such as the selection of drying apparatus, energy consumption, drying rate and the treatment of secondary product. The drying process will result in large energy consumption, and the characteristics of sludge, such as complex composition and high moisture content, make the drying more complicated. Moreover, condensation will occur in the early period of the drying, which may increase the moisture content, reducing the drying efficiency of the sludge.

There are various sticky substances in the sludge such as organic matters, which may cause a blockage during the transportation and the occurrence of wall sticking. The wall sticking is frequently observed in chemical, pharmaceutical, food processing and textile industries. During the drying process, the occurrence of wall sticking not only increases the thermal resistance and reduces the drying efficiency, but also causes security risks to the drying apparatus.

It has been reported by Xukun Zhang et al. (Drying models and characteristics of thin layer sludge in superheated steam drying[J]. Transactions of the Chinese Society of Agricultural Engineering, 2014, 30(14): 258-266) that the superheated steam condensation occurring at the initial stage of the drying has a negative effect on the drying since the condensation will increase the moisture content of the materials, and prolong the period of the entire drying process. As disclosed by Xiangdong Wen (Research on shrinkage characteristics of sludge in superheated steam and hot air drying[D], Nanchang Hangkong university, 2016), the sludge moisture content is positively correlated with the sludge volume. Moreover, it has been found by Feng Liu (Study of town sludge stickiness in drying process[D], Tianjin University, 2018) that the drying completely occurs on the surface of the sludge at the early stage, and with the evaporation of water, gaps gradually appear inside the sludge, which indicates the occurrence of shrinkage. With the progress of shrinkage, the surface tension and the viscosity of the sludge decrease, and cracks appear on the surface.

Xingrun Wang et al. (Progress and Techniques for Thermal Sludge Drying at Home and Abroad[J], China Water & Wastewater, 2007, 23 (8): 5-8) has demonstrated that in the indirect thermal-conduction drying, the drying medium can be recycled, however, in the case of high moisture content, the sludge is prone to wall sticking, resulting in high heat transfer resistance, large energy consumption and low drying efficiency. weiyun Wang (Study on indirect thin-layer drying and dehydration drying coupled with thermal pressure of sludge[D], Dalian University of Technology, 2012) has found that during the indirect drying, the closer the sludge to the heat transfer surface is, the faster the moisture content will be reduced. It has also been published in zhaoqing Wu (Experimental exploration of influencing factors of sludge adhering behavior and analysis of adhering mechanism[D], Tianjin University, 2007) that during the indirect drying, sludge moisture content is the most primary factor resulting in the adhesion.

Teflon, also called polytetrafluoroethylene (PTFE) has the characteristics of high-temperature resistance, corrosion resistance, non-stick property, self-lubricating property and low friction coefficient, so that it is feasible to coat the drying apparatus with Teflon to effectively reduce the occurrence of sludge adhesion.

When the sludge is in contact with the heating surface, the thin layer directly contacting with the heating surface is rapidly dried and reduced in the moisture content, so that the contact part is rapidly shrunk. Meanwhile, a steam film is formed between the heating surface and the shrunk surface, which can also effectively prevent the occurrence of adhesion and increase the drying efficiency.

Since the steam has the advantages of good heat capacity, strong hygroscopicity and no mass transfer resistance, it can be used to enable the rapid heating of a thermally-conductive material such as a roller, and the condensed water can be reused due to the existence of condensation heat.

Currently, there are some apparatuses and methods that have been developed for the energy-saving drying treatment of sludge, as disclosed in the following literatures.

Chinese Patent No. 203741205 U discloses a vertical multi-stage indirect sludge dryer, where a top of a sludge inlet end of the dryer is provide with an air outlet, and a bottom of the dryer is provided with an air inlet, which can further reduce the moisture content to form dry granular sludge, facilitating the recycling of sludge resources. This dryer has the advantages of indirect heating, closed air circulation and low waste air generation.

Chinese Patent CN 200989712Y discloses a sludge drying tower, where the drying tower is designed to be vertical to allow the sludge to enter the tower from the top of the drying tower and to fall freely, saving the power for transportation. The hot air is transported from bottom to top and the sludge is transported from top to bottom, forming a countercurrent therebetween. The sludge is evenly mixed with hot air in the drying tower, so that the moisture content is decreased from 60% to below 30% in a shorter time, and the sludge is dried to be non-sticky hard granules.

Chinese Patent Publication No. 102260033 A discloses a multistage drying method for sludge using secondary steam compression. In the method, secondary steam generated from the sludge drying is introduced into a steam/water separation buffer tank and then into a steam compressor, so that the steam can be reused as a heat source for the next-stage drying. However, this method involves the considerable production of tail gas. Moreover, during the steam or water separation, the separated water brings out a large amount of energy, and there is still a considerable amount of gas mixed in the steam, causing damage to the compressor and reducing the drying effect.

Chinese Patent Publication No. 1686876 A discloses a superheated steam sludge drying method and a device implementing the same. In the method, latent heat and sensible heat of the drying tail steam are recycled by a heat exchanger to exchange heat with water, and then the hot water is heated into superheated steam. Although the latent heat from the superheated steam drying is recovered, the heat exchange efficiency of the heat exchanger is not satisfactory. In addition, the re-generation of steam from hot water involves large energy consumption, so this method actually only achieves energy conservation to a certain extent.

Chinese Patent No. 205222968 U discloses an energy-saving sludge drying device using waste heat, where the heat collecting coil of the device is provided with a spiral groove recessed into the coil body to ensure the desired contact area and improve heat exchange efficiency. Water is heated by solar energy, and the heat energy generated by heating in an insolation tank is recovered by a recovery system, reducing the consumption of conventional energy and avoiding the pollution generation.

Chinese Patent No. 206828352 U discloses a waste water sludge treatment and recovery device. The device reduces the viscous of sludge by heating the sludge in the transportation, which not only reduces the amount of sludge adhering to the transportation device, but also facilitates the extraction of sludge, improving the sludge transportation.

Chinese Patent Publication No. 107148814 A discloses a coupling bionic plowshare with reduced resistance and adhesion, which includes a ploughshare body and a bionic claw. The surface of the ploughshare is coated with PTFE, and the cross-sectional profile of the bionic claw consists of three curves, which can effectively reduce the resistance the soil-engaging component suffering from, reducing the adhesion of the sticky wet soil.

Chinese Patent No. 207159076 U discloses a shock-absorbing and stirring chemical sludge drying apparatus, where a motor drives the second transmission wheel on a transmission shaft to rotate, and then the first transmission wheel is driven to rotate through the transmission belt. The stirring shaft is driven to rotate to drive a semicircular stirring blade to rotate to stir the sludge in an arc area in a sludge drying tank. Simultaneously, the straight stirring blade is driven to stir the sludge in the center of the sludge drying tank, and the scraping plate is driven to rotate to scrape the sludge from the inner wall of the sludge drying tank.

Chinese Patent No. 204079744 U discloses a double-shaft hollow blade dryer, where the two hollow shafts and blades are designed to rotate reversely and the blades are respectively provided with a scraper, so that when sludge is dried in the dryer, the reversely-rotating blades can cut the sludge to reduce the adhesion of the sludge and enhance the drying efficiency, preventing the sludge sticking and caking.

Chinese Patent No. 205808034 U discloses a device, in which the wedge-shaped hollow blades are designed to mesh with each other and mounted on two adjacent shafts. Steam is introduced into the shafts to dry the sludge by heat conduction. When the sludge adheres to the apparatus, the mutually-meshed blades are able to achieve the effect of mutual cleaning, thereby reducing the adverse effect of sludge adhesion on drying and enhancing the heat transfer effect.

Chinese Patent Publication No. 106219936 A discloses that by changing the structure of the blades, the blades can move and vibrate back and forth in a fixed area on the shaft, removing sludge on the shaft and the blades.

Chinese Patent No. 206359409 U discloses an anti-adhesion sludge dryer, where a plurality of parallel hollow shafts alternately provided with hollow discs are arranged in the dryer barrel and a scraping plate is provided at one end of the hollow disc, so that the sludge can be scraped off by adjusting the inclination angle of the hollow discs, reducing the adhesion and improving sludge drying efficiency.

SUMMARY OF THE INVENTION

An object of the invention is to provide a multi-stage gravity-type sludge drying apparatus and a method for drying sludge using the same to overcome the defects in the prior art such as high energy consumption, complicated apparatus, difficult maintenance, adhesion and slow drying rate.

Technical solutions of the invention are described as follows.

The invention provides a multi-stage gravity-type sludge drying apparatus, comprising: a preheater, a sludge dryer, a steam recovery system and a steam generator;

wherein a bottom of the preheater is communicated with a sludge inlet of the sludge dryer through a sludge conveyor, the sludge dryer comprises a drying chamber and multiple stage of indirect dryers provided therein, respective indirect dryers comprise a pair of first rollers, a surface of a cylinder of respective first rollers is provided with a plurality of annular grooves; the cylinder of respective first rollers is axially provided with a first joint connecting with a steam pipe and a condensation water pipe, a bottom of the drying chamber is provided with a sludge outlet and a convection steam inlet; a top of the drying chamber is provided with a secondary steam outlet, and the secondary steam outlet is communicated with the steam recovery system through a pipeline; and the steam recovery system comprises a heater.

In an embodiment, the preheater comprises a sludge chamber and a drying module; the sludge chamber is arranged on a top of the drying module; the drying module comprises a pair of second rollers, the respective second rollers is axially provided with a joint connecting with the condensation water pipe; and a bottom of the drying module is connected with the sludge conveyor.

In an embodiment, the annular groove are evenly distributed on the surface of cylinder of respective first rollers, and a width of the groove is greater than a distance between the two adjacent annular grooves; and a wall surface of respective annular grooves is provided with a draft angle and a fillet.

In an embodiment, there are 5 stages of indirect dryers vertically arranged in the indirect dryers from top to bottom; surfaces of cylinders of first rollers of the third and fourth stages of indirect dryers are sprayed with an anti-adhesion material; and the anti-adhesion material is Teflon.

In an embodiment, the sludge outlet is connected with a two-stage sealed discharge structure, and the two-stage sealed discharge structure comprises a rotary valve.

In an embodiment, the steam recovery system comprises a filter, a first steam or water separation buffer tank, a steam compressor, a second steam or water separation buffer tank and the heater sequentially connected.

In an embodiment, the first steam or water separation buffer tank is provided with a pipe connecting with the condensation water pipe and a cooling pipe connecting with the steam compressor, and the cooling pipe is provided with a cooling water pump.

In an embodiment, a steam outlet of the heater and a steam outlet of the steam generator are converged and then connected with a separate cylinder; steam outlets of the separate cylinder are respectively connected with the steam pipe and the convection steam inlet; the condensation water pipe is provided with a steam trap.

The invention also provides a method of drying sludge using the above apparatus, comprising:

(1) preheating wet sludge in the preheater, and passing the preheated sludge to the sludge conveyor;

(2) transporting the preheated sludge to the sludge dryer through the sludge inlet and drying the preheated sludge by the multiple stages of indirect dryers fed with steam.

(3) passing secondary steam in the secondary steam outlet provided on the top of the drying chamber sequentially through the filter, the first steam or water separation buffer tank, the steam compressor, the second steam or water separation buffer tank and the heater to recover the secondary steam; merging the recovered secondary steam with steam generated from the steam generator; passing one part of the merged steam into an inner cavity of respective indirect dryers through the steam pipe connecting with respective stages by the steam separating cylinder to release condensation heat to perform indirect heat-conduction drying and passing the other part of the merged steam into the sludge dryer through the convection steam inlet to convectively dry the sludge from bottom to top; and (4) discharging the dried sludge sequentially through the sludge outlet and the two-stage sealed discharge structure.

Compared to the prior art, the invention has the following beneficial effects.

1. The transportation of sludge in the dryer is achieved by gravity, and only a small amount of mechanical energy is required to drive the dryer to rotate slowly.

2. The sludge is first treated by the preheater before entering the drying unit for impurity removal and preheating, which can protect the device and increase the fluidity of the sludge, preventing the sludge from blocking the sludge pump, reducing the condensation of sludge in the initial stage of the drying unit and improving the drying efficiency.

3. Superheated steam is used as a drying medium herein, which is free of mass transfer resistance, so that the sludge surface is not prone to incrustation, facilitating the further evaporation of water.

4. The inner cavity of the paired rollers in the indirect dryer has high temperature steam, which can dry the sludge to shrink and generating a steam film between the surface of cylinder of respective first rollers cylinder and the sludge, so that the sludge falls off and enters the next stage of the indirect dryer under the action of gravity and the rotation of the paired rollers.

5. Part of the condensate water generated in the steam or water separation buffer tank is used for the cooling of the steam compressor, which can not only avoid the excessive exhaust temperature of the steam compressor, but also can prevent the failure in main water-spraying pipeline of the steam compressor, effectively preventing the occurrence of dry heating in the compressor in the absence of water.

6. The condensate water generated in the indirect dryer and the condensate water generated in the steam or water separation buffer tank can be directly used for the preheating of sludge in the sludge chamber, achieving the recovery of some sensible heat.

7. The invention adopts a filter and a steam or water separation buffer tank to purify the secondary steam, which not only purifies the steam but also protects the compressor.

8. When the sludge reaches the third or fourth stage of the indirect dryer, the viscosity of the sludge reaches the maximum in the drying process. Moreover, the Teflon sprayed on the surface of the rollers at the third and forth stages of the indirect dryer facilitates the formation of a steam film between sludge and the Teflon coating after the sludge is heated to lose a large amount of water in a short time, allowing the sludge to pass through the drying and sticking area smoothly and avoiding the wall sticking.

9. The heating interface composed of Teflon coating has low surface friction coefficient, low surface energy, self lubrication, high temperature resistance, corrosion resistance and good heat transfer ability, which can reduce the heat loss when the steam heat source heats the sludge.

10. Due to the low surface energy of the Teflon coating and the low moisture content of the sludge near the heating surface, the viscose substances in sludge fail to completely wet the heating surface through the moisture in sludge, reducing the adhering effect between sludge and heating surface.

11. The secondary steam can be used as a new heat source for indirect drying and convective drying to completely recover the latent and sensible heat.

12. The sludge dryer is modularly designed, which is convenient for production and maintenance.

13. The non-condensable gas in the secondary steam is removed in the filter.

14. The sludge is extruded into strips, facilitating the transportation and treatment.

BRIEF DESCRIPTION OF THE DRAWINGS

The invention will be further described below with reference to the embodiments and drawings to make the technical solutions clearer. Obviously, the embodiments provided below are merely illustrative of the invention and are not intended to limit the invention. Various embodiments made by those skilled in the art without sparing any creative effort should fall within the scope of the invention.

In the drawings: 1: sludge dryer; 1-1: sludge inlet; 1-2: secondary steam outlet; 1-3: steam pipeline inlet; 1-4: convection steam inlet; 1-5: sludge outlet; 1-6: condensation water pipe inlet; 1-7: condensation water pipe outlet; 2: preheater; 3: sludge injection pump; 4: filter; 5 first steam or water separation buffer tank; 6: steam compressor; 7: second steam or water separation buffer tank; 8: cooling water pump; 9: heater; 10: steam generator; 11: separate cylinder; 12: sealed discharge structure; 13: steam trap; 14: annular groove; 15: rotary joint; a, b, c, d: valves; A: indirect dryer free of Teflon coating; B: indirect dryer sprayed with Teflon coating; B-1: dryer cylinder; B-2: Teflon coating; B-3: steam film; B-4: sludge near the heating surface; B-5: sludge; and C: surface of the indirect dryer cylinder.

DETAILED DESCRIPTION OF EMBODIMENTS

The technical solutions in the embodiments of the invention will be clearly and completely described below with reference to the drawings. Obviously, the described embodiments are only part of the embodiments of the invention, and are not intended to limit the invention. Other embodiments obtained by those skilled in the art without sparing any creative efforts shall fall within the scope of the invention.

An object of the invention is to provide a multi-stage gravity-type sludge drying apparatus and a drying method using the same to solve the problems in the prior art such as high energy consumption, complicated apparatus, difficult maintenance, wall sticking and slow drying rate.

In order to make the objects, features and advantages of the invention more obvious and understood, the invention will be further described with reference to the drawings and embodiments.

Figure 1:
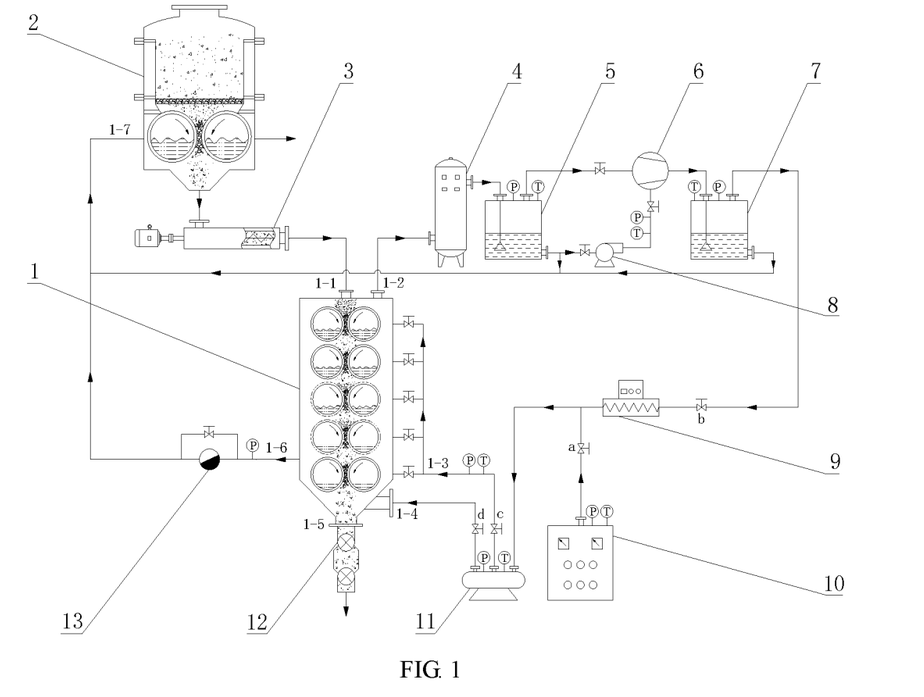
FIG. 1 is a schematic diagram of a multi-stage gravity-type sludge drying apparatus of the invention.
Figure 2:
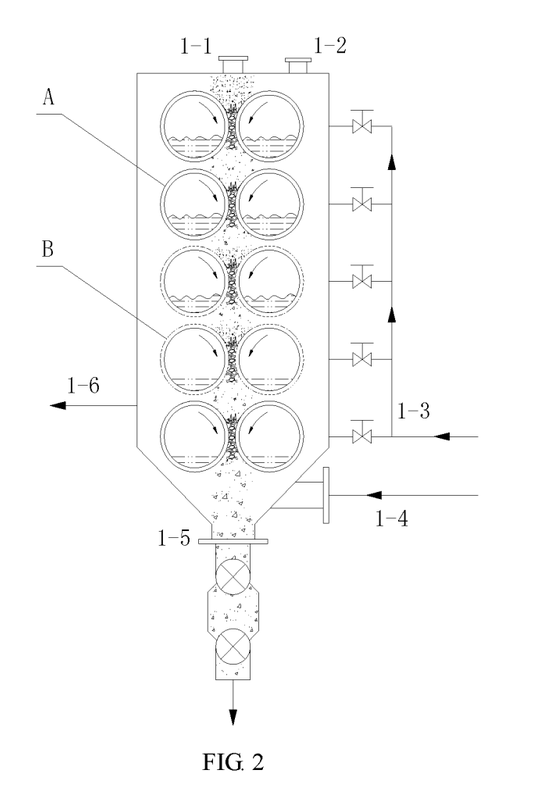
FIG. 2 is a schematic diagram of a sludge dryer of the sludge drying apparatus of the invention.
Figure 3:
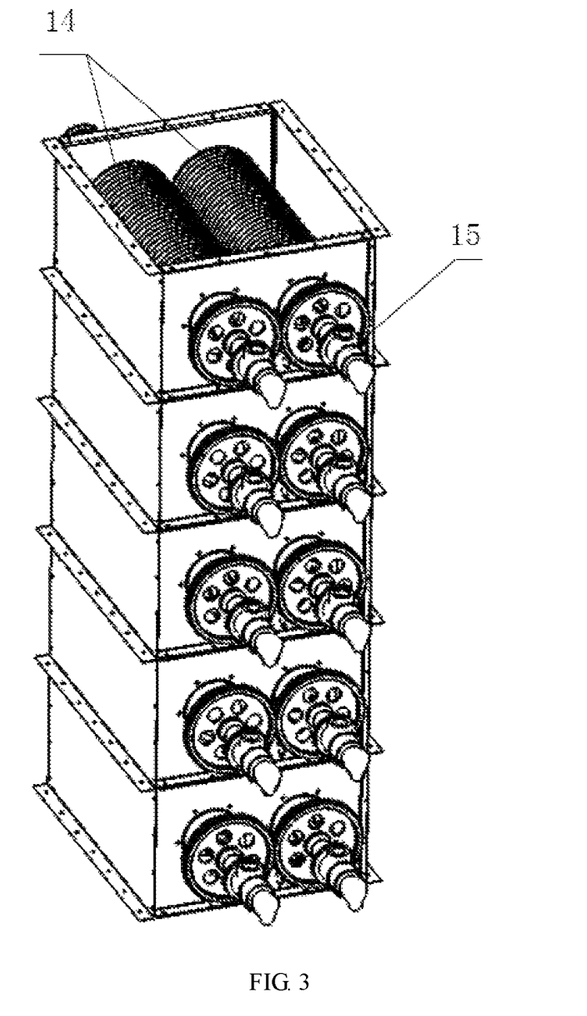
FIG. 3 is a perspective view of a combination of 5 stages of indirect dryer modules.
Figure 4A:
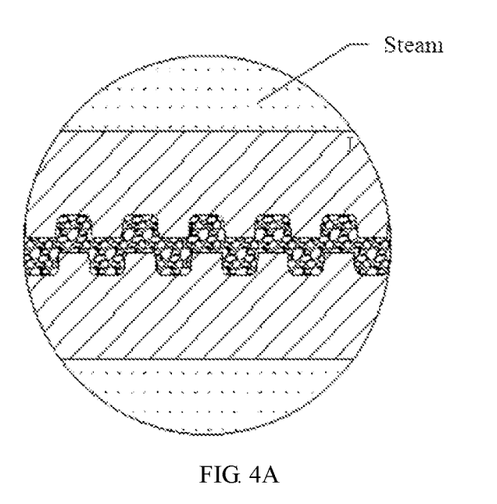
FIG. 4A shows the shrinkage of the sludge before heating.
Figure 4B:
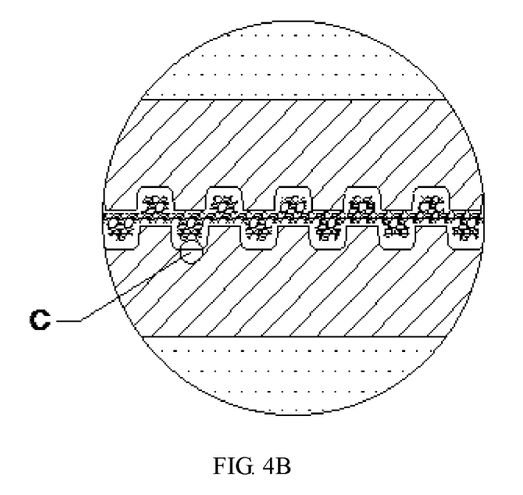
FIG. 4B shows the shrinkage of the sludge after heating.
Figure 5:
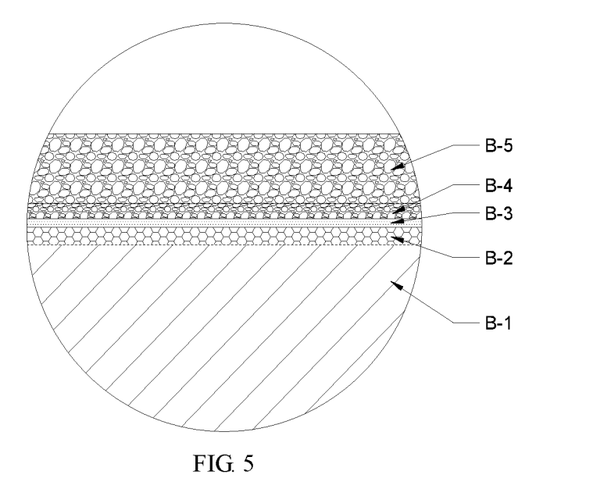
FIG. 5 is a partial enlarged view of the heating surface of the indirect dryer during the rapid heating stage.

The sludge drying apparatus of the present invention is shown in the figures. FIG. 1 is a schematic diagram of a multi-stage gravity-type sludge drying apparatus of the invention; FIG. 2 is a schematic diagram of the sludge dryer, where the dryer is modularly designed through the combination of 5 stages of indirect drying modules; FIG. 3 is a perspective view of the combination of 5 stages of indirect dryer modules, where cylinders of the third and forth stages of dryers are sprayed with an anti-adhesion material; FIG. 4A schematically shows the shrinkage of the sludge before heating and FIG. 4B schematically shows the shrinkage of the sludge after heating; and FIG. 5 is a partial enlarged view showing the heating surface of the indirect dryer during the rapid heating stage.

As shown in FIGS. 1 and 3, respective stages of indirect dryer modules are combined, and then installed in a closed housing to form a sludge dryer. A top of the sludge dryer is provided with a sludge inlet 1-1 connected with a sludge injection pump 3, and a secondary steam outlet 1-2, where the secondary steam outlet 1-2 is connected successively with a filter 4, a first steam or water separation buffer tank 5, a steam compressor 6, a second steam or water separation buffer tank 7 and a heater 9. A bottom of the sludge dryer is provided with a sludge discharge outlet 1-5 and a convection steam inlet 1-4, where the sludge outlet 1-5 is connected with a two-stage sealed discharge structure 12, and the convection steam inlet 1-4 is connected with a steam outlet of the separate cylinder 11. Individual indirect dryers include a pair of rollers, and a surface of a cylinder of each roller is provided with a plurality of annular grooves 14. The individual indirect dryers are axially provided with a rotary joint 15 to connect with a steam pipe inlet 1-3 and a condensation water pipe inlet 1-6, and the steam pipe inlet 1-3 is further connected with a steam outlet of the separate cylinder 11.

A steam outlet of a steam generator 10 and a steam outlet of the heater 9 are converged and then connected with a steam inlet of the separate cylinder 11.

A lower part of the preheater 2 is provided with a large drying module, which is axially provided with a rotary joint to connect with the condensation water pipe outlet 1-7. Further, a condensation water pipe is arranged between the condensation water pipe inlet 1-6 and the condensation water pipe outlet 1-7, where a steam trap 13 is arranged at the condensation water pipe.

The condensate water outlets of the first steam or water separation buffer tank 5 and the second steam or water separation buffer tank 6 are connected with the condensation water pipe, where the condensate water outlet of the first steam or water separation buffer tank 5 is connected with a cooling water pump 8 and then connected with a cooling water sprinkler of the steam compressor 6.

The embodiment also provides a sludge drying method using the above apparatus, which is specifically described as follows.

After fed through the feed inlet 1-1, the sludge moves downwards under the action of gravity and the rotation of the rollers. At this time, one parts of the steam in the separate cylinder 11 enters the inner cavity of respective indirect dryers from the steam pipe inlet 1-3 to indirectly dry the sludge, and the other part of steam enters the drying chamber from the convection steam inlet 1-4 to convectively dry the sludge. Due to the rapid heat transfer of the indirect dryer A, a sludge thin layer is quickly dried in the sludge dryer 1 to show volume shrinkage and a steam film is generated between the surface of the indirect dryer cylinder C and the sludge. FIG. 4 shows the volume changes of the sludge before and after the heating in the indirect dryers.

In the early period, the sludge is dried in a constant rate drying stage, and has high moisture content and a relatively lower viscosity. At the middle stage, the sludge viscosity reaches the maximum. At this time, the sludge is passing through the indirect dryer B sprayed with Teflon coating.

FIG. 5 is a partial enlarged view showing the heating surface of the indirect dryer B during the rapid heating stage, where the outer surface of the dryer cylinder B-1 is coated with a Teflon coating B-2 with low surface energy, which can reduce the surface energy of the heating surface while ensuring the heat transfer efficiency, reducing the adhering effect between the sludge and the heating surface.

During the middle stage of the drying (i.e., viscosity-reducing indirect drying stage), the normal-temperature sludge is in contact with the indirect heating surface to enter the indirect heating stage. As shown in FIG. 4, the surface drying rate of the sludge B-4 near the heating surface is higher than that of the sludge B-5. The volume of the sludge B-4 near the heating surface is shrunk rapidly after the sharp decrease in moisture content, and a steam film B-3 is formed between the sludge B-4 near the heating surface and the Teflon coating B-2 with low surface energy, which allows the sludge B-5 to be separated transiently from the heating surface, facilitating the separation of sludge from the heating surface. Due to the rapid reduction in the moisture content of the sludge B-4 near the heating surface and the low surface energy of the heating surface, the adhesive substances in the sludge B-5 cannot contact the heating surface well, so that it fails to generate the wall-adhering effect, greatly reducing the wall-adhering effect between the sludge and the heating surface.

Meanwhile, the condensed water generated in the inner cavity of the indirect dryers is discharged from the condensation water pipe inlet 1-6 to the preheater 2 through the steam trap 13 to remove the impurities and preheat the wet sludge in the sludge chamber, which can increase the fluidity of the sludge, avoiding the blockage in the sludge injection pump 3 and the occurrence of condensation during the initial stage of the drying in the sludge dryer 1, improving the drying efficiency. The preheater 2 can also play a role in removing impurities and protecting apparatus.

The secondary steam generated in the sludge dryer 1 is discharged from the secondary steam outlet 1-2 to the filter 4 to remove impurities such as dust in the steam. The filtered secondary steam is passed into the first steam or water separation buffer tank 5 to remove water droplets from the steam. Then the secondary steam is increased in the enthalpy value and temperature through the steam compressor 6 and then passed into the second steam or water separation buffer tank 7 to remove the water droplets after the compression. After properly overheated by the heater 9, the secondary steam is mixed with the primary steam supplemented by the steam generator 10 to be as a new heat source. Through the separate cylinder 11, some of the mixed steam enters into the inner cavity of the indirect dryers from the indirect steam pipe inlet 1-3, and the rest of the mixed steam enters the drying chamber from the convection steam inlet 1-4.

The dust and water droplets in the secondary steam can be removed after passing through the filter 4 and the first steam or water separator buffer tank 5, protecting the steam compressor 6 and extending the service life thereof. At the same time, a high exhaust temperature will occur after the long-term operation of the steam compressor 6, so a part of the condensate water in the first steam or water separation buffer tank 5 is pumped by the cooling water pump 8 to cool the steam compressor 6, and the other condensate water is used to preheat the sludge in the preheater 2.

After indirectly dried by the multiple stages of indirect dryers and convectively dried by the convection steam in the dryer 1, the sludge is discharged from the sludge outlet 1-5 through the two-stage sealed discharge structure 12.

The sludge dryer is mainly composed of several indirect dryer modules. Compared to the paddle dryer and the plate dryer, the energy consumed by the mechanical operation of the sludge dryer provided herein is greatly reduced since the transportation of sludge in the dryer is achieved by gravity. The inner cavity of the indirect dryers is filled with high-temperature steam to indirectly and rapidly dry the sludge, which results in a decrease in the moisture content and volume of the sludge, allowing the sludge to shrink toward the center. At the same time, a steam film is formed between the sludge and the heating surface, reducing the viscosity. The condensed water in the inner cavity is recycled and fed into the preheater 2 to perform preheating and impurity removal on the wet sludge. The secondary steam generated in the sludge dryer is filtered, compressed and overheated to become a new heat source for the indirect heating in the cavity and convection drying at the bottom of the sludge dryer. The Teflon coating with low surface energy sprayed on the heating contact surfaces of the third and fourth stages of the indirect dryers enables the sludge to pass through the indirect dryers smoothly when the viscosity reaches the maximum during the middle stage of the drying, avoiding the wall adhesion.

The apparatus adopts a modular design, which not only facilitates the installation and manufacturing, reduces the energy consumption for mechanical operation and avoids the wall adhesion, but also recycles all the latent and sensible heat of the secondary steam generated during the drying, having significant energy-saving effects.

The above embodiments are merely illustrative of the invention, and are not intended to limit the invention. Various modifications and changes made by those skilled in the art based on the content disclosed herein should fall within the scope of the invention.

What is claimed is:

1. A multi-stage gravity-type sludge drying apparatus, comprising:
    a preheater,
    a sludge dryer,
    a steam recovery system comprising a filter, a first steam or water separation buffer tank, a steam compressor, a second steam or water separation buffer tank and a heater which are sequentially connected, and
    a steam generator;
    wherein a bottom of the preheater is communicated with a sludge inlet of the sludge dryer through a sludge conveyor; the sludge dryer comprises a drying chamber and multiple stages of indirect dryers provided therein; respective indirect dryers comprise a pair of first rollers; a surface of a cylinder of respective first rollers is provided with a plurality of annular grooves; the cylinder of respective first rollers is axially provided with a first joint connecting with a steam pipe and a condensation water pipe; a bottom of the drying chamber is provided with a sludge outlet and a convection steam inlet; a top of the drying chamber is provided with a steam outlet; and the steam outlet is communicated with the steam recovery system through a pipeline.

2. The apparatus of claim 1, wherein the preheater comprises a sludge chamber and a drying module; the sludge chamber is provided on a top of the drying module; the drying module comprises a pair of second rollers, and respective second rollers are axially provided with a second joint connecting with the condensation water pipe; and a bottom of the drying module is connected with the sludge conveyor.

3. The apparatus of claim 1, wherein the annular grooves are evenly distributed on the surface of the cylinder of respective first rollers; a width of respective annular grooves is greater than a distance between two adjacent annular grooves; and a wall surface of respective annular grooves is provided with a draft angle and a fillet.

4. The apparatus of claim 1, wherein there are 5 stages of indirect dryers vertically arranged; surfaces of cylinders of first rollers of the third and fourth stages of indirect dryers from top to bottom are sprayed with an anti-adhesion material; and the anti-adhesion material is Teflon.

5. The apparatus of claim 1, wherein the sludge outlet is connected with a two-stage sealed discharge structure; and the two-stage sealed discharge structure comprises a rotary valve.

6. The apparatus of claim 1, wherein the first steam or water separation buffer tank is provided with a pipe connecting with the condensation water pipe and a cooling pipe connecting with the steam compressor; and the cooling pipe is provided with a cooling water pump.

7. The apparatus of claim 1, wherein a steam outlet of the heater and a steam outlet of the steam generator are converged and then connected with a separate cylinder; steam outlets of the separate cylinder are respectively connected with the steam pipe and the convection steam inlet; and the condensation water pipe is provided with a steam trap.

8. A method of drying sludge using the apparatus of claim 1, comprising:
    (1) preheating wet sludge in the preheater, and passing the preheated sludge to the sludge conveyor;
    (2) transporting the preheated sludge to the sludge dryer through the sludge inlet and drying the sludge by the multiple stages of indirect dryers fed with steam;
    (3) passing secondary steam in the steam outlet provided on a top of the drying chamber sequentially through the filter, the first steam or water separation buffer tank, the steam compressor, the second steam-water separation buffer tank and the heater to recover the secondary steam; merging the recovered secondary steam with steam generated from the steam generator; passing one part of the merged steam into an inner cavity of respective indirect dryers through the steam pipe connecting with respective stages by a separate cylinder to release condensation heat to perform indirect heat-conduction drying and passing the other part of the merged steam into the sludge dryer through the convection steam inlet to convectively dry the sludge from bottom to top; and (4) discharging the dried sludge sequentially through the sludge outlet and a two-stage sealed discharge structure.

* * * * *